(12) United States Patent
Brand

(10) Patent No.: US 6,750,771 B1
(45) Date of Patent: Jun. 15, 2004

(54) ANTENNA SYSTEM AND METHOD FOR READING LOW FREQUENCY TAGS

(75) Inventor: Timothy K. Brand, Cupertino, CA (US)

(73) Assignee: Savi Technology, Inc., Sunnyvale, CA (US)

(*) Notice: Subject to any disclaimer, the term of this patent is extended or adjusted under 35 U.S.C. 154(b) by 124 days.

(21) Appl. No.: 09/912,076

(22) Filed: Jul. 24, 2001

Related U.S. Application Data

(60) Provisional application No. 60/225,032, filed on Aug. 10, 2000.

(51) Int. Cl.[7] .............................................. G08B 13/14
(52) U.S. Cl. ................. 340/572.7; 340/572.1; 340/572.2; 340/572.4
(58) Field of Search .................. 340/572.7, 572.1, 340/572.4, 572.5, 10.1, 10.2, 10.3; 343/756, 748, 742

(56) References Cited

U.S. PATENT DOCUMENTS

| | | | | |
|---|---|---|---|---|
| 5,051,726 A | * | 9/1991 | Copeland et al. | 340/572 |
| 5,258,771 A | * | 11/1993 | Praba | 343/895 |
| 5,592,182 A | * | 1/1997 | Yao et al. | 343/742 |
| 6,094,173 A | * | 7/2000 | Nylander | 340/572 |
| 6,271,756 B1 | * | 8/2001 | Davies, Jr. et al. | 340/572.7 |

OTHER PUBLICATIONS

Lee, "RFID Coil Design," *Microchip*, AN678, 1998, 20 pages.
"The ARRL Handbook for Radio Amateurs 2001," The National Association for Amateur Radio, 2001, complete book.

* cited by examiner

*Primary Examiner*—Jeffery Hofsass
*Assistant Examiner*—Hung Nguyen
(74) *Attorney, Agent, or Firm*—Fenwick & West LLP

(57) ABSTRACT

A reader reads identifiers from tags on pallets conveyed past the reader. The reader includes two interleaved linear arrays of antennas with circularly polarized fields. Each antenna is composed of a pair of crossed rods phased to have adjacent antennas of an array generate circularly polarized fields of opposite rotation. The vector components of the polarization in the direction across the width of the conveyor have peaks and nulls, and the interleaved arrays are arranged such that the nulls of one array's fields are covered with the peaks of the other array's fields. This arrangement allows the reader to the identifier from the tag when the tag is at any orientation. A tag at the side of the reader is aligned in the direction of travel by rails on the conveyor. The reader has antennas aligned in the direction of travel to read such tags.

3 Claims, 5 Drawing Sheets

ANTENNA SYSTEM AND METHOD FOR READING LOW FREQUENCY TAGS

CROSS-REFERENCE TO RELATED APPLICATION

This application claims the benefit of U.S. Provisional Application No. 60/225,032, filed Aug. 10, 2000, which is incorporated by reference herein.

BACKGROUND

1. Field of the Invention

This invention pertains in general to a radio-frequency sensor for reading data from passing tags and in particular for a low frequency sensor for reading passive tags.

2. Background Art

There is a general desire to know the location of goods in the supply chain. For example, a manufacturer may need real-time data regarding the location of needed parts. A common way to gather this real-time data is to record when the goods pass through supply-chain choke points, such as loading docks at airports, shipyards, train stations, and truck depots. A unique identifier is assigned to each container holding the goods (e.g., pallet, crate, truck, envelope) and the identifier, or data pertaining to the container or contents, is recorded when the container passes through the choke points.

One technique for assigning the unique identifier to shipping containers is placing a small electronic tag having the identifier on the container. A specialized reader senses the unique identifier as the container passes through the choke point.

In order for the reader to sense the identifier, the polarizations of the electromagnetic fields generated by the antennas in the reader and tag must be aligned. In most real-world implementations, however, the orientation of the tag, and, hence, the polarization of the field generated by the tag's antenna, is unknown. For example, if the tag is attached to the top of a pallet being carried past the reader by a conveyor belt, the tag may be oriented parallel to the direction of travel, orthogonal to the direction of travel, or at some other angle. Therefore, there is a need in the art for a reader that can read tags regardless of the tags' orientations.

DISCLOSURE OF THE INVENTION

The above need is met by a reader that uses antennas generating circularly polarized fields to read tags having any orientation. The reader includes two interleaved linear arrays of antennas, each antenna composed of a pair of crossed rods phased such that each crossed pair and thus each antenna generates a circularly polarized field. Fields of adjacent antennas in an array are arranged to have opposite rotation, thus, the vector components of the polarization in the direction across the width of the conveyor have peaks and nulls. To provide a more uniform field, the arrays are interleaved such that the nulls of one array's fields are covered with the peaks of the other array's fields. This arrangement allows the reader to read the identifier from the tag when the tag is at any orientation. A tag appearing at the extremity of the reader will be constrained by rails on the conveyor to be aligned in the direction of travel. The antennas at the extremity of the reader are polarized in the direction of travel in order to read such tags.

DETAILED DESCRIPTION OF THE PREFERRED EMBODIMENTS

Figure 1:
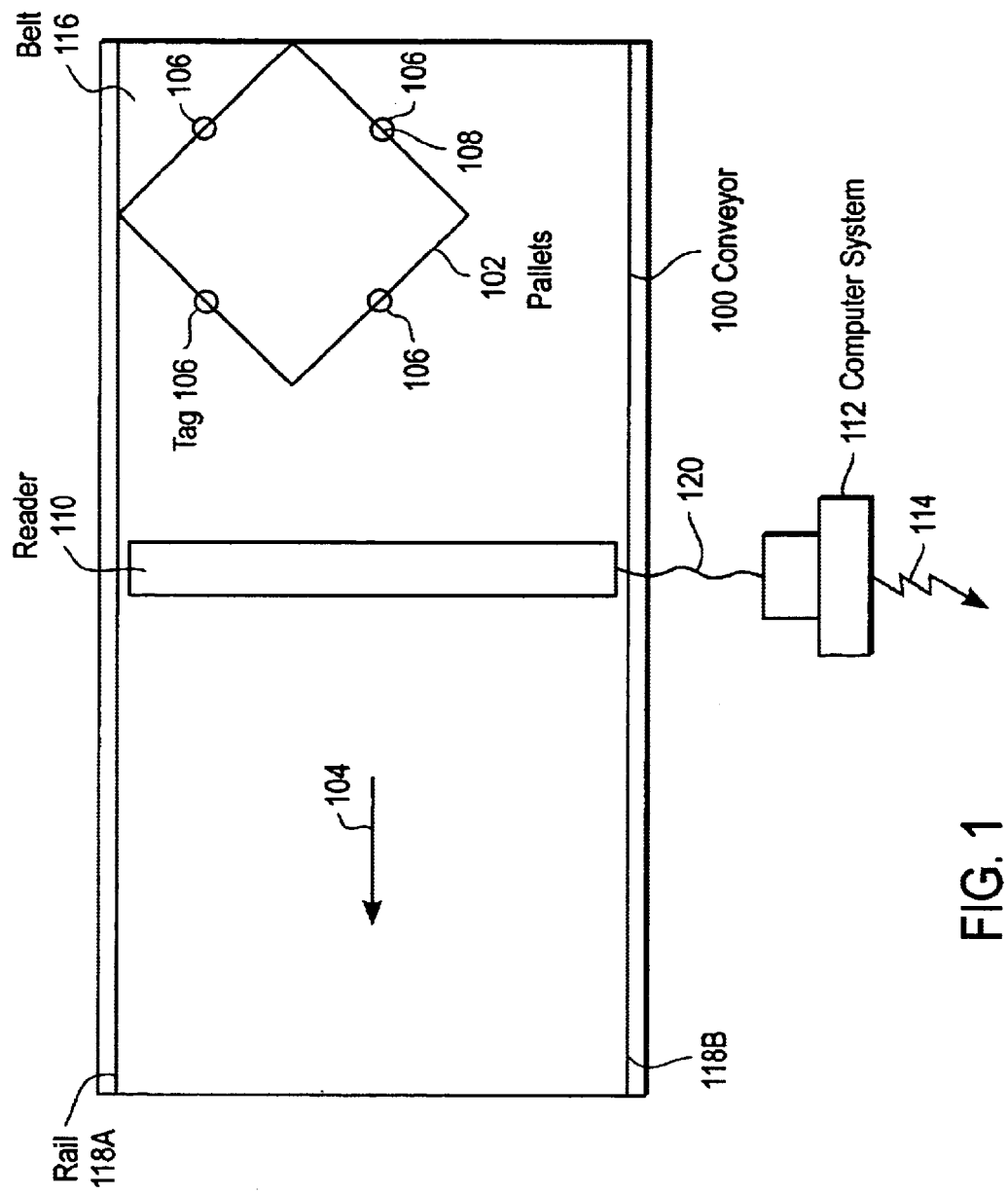
FIG. 1 is an illustration of a typical setting for monitoring the location of goods in a supply chain.

FIG. 1 is an illustration of a typical setting for monitoring the location of goods in a supply chain. A conveyor 100 conveys pallets, such as pallet 102, in the direction indicated by the arrow 104. In one embodiment, the conveyor 100 includes an eight foot wide belt 116 supported and moved by rollers (not shown) at a rate of approximately ½ meter/second. Preferably, the surface defined by the belt 116 is substantially planar. In one embodiment, rails 118A, 118B are disposed at the sides of the belt 116 to keep the pallet 102 on the conveyor 100. Although a conveyor 100 is illustrated, other techniques or devices, such as forklifts, carts, or trucks, can move the pallet 102. The term "conveyor" generally refers to any technique or device for moving the pallet 102 past the reader 110 (or moving the reader past the pallet).

The pallet 102 rests on top of the belt 116 and moves with it. In one embodiment the pallet 102 is constructed of aluminum, although it can also be constructed of other materials. As is known in the art, the pallet 102 serves as a base onto which goods or other freight items are loaded. The bottom surface of the pallet 102 is preferably substantially planar, so that the pallet rests flat on the surface defined by the belt 116. In alternative embodiments, crates, envelopes, trucks, or other shipping containers are utilized instead of, or in addition to, pallets.

The width of the pallet 102 is less than the width of the conveyor 100. In one embodiment, the minimum width of a pallet is five feet. Other embodiments utilize pallets having a different size. Unless the pallet 102 is too wide, it can be oriented in essentially any direction with respect to the sides of the conveyor 100. In other words, the sides of the pallet 102 are not necessarily parallel to the sides of the belt 116 and rails 118 and the pallet 102 has an essentially random orientation in the plane of the belt. As used herein, "random" means "unknown" or "indeterminate."

In one embodiment, the pallet 102 has a channel (not shown) into which a tag 106 is affixed. The channel preferably allows the tag 106 to be affixed to a position adjacent to the midpoint of a side of the pallet 102. In FIG. 1, possible tag positions are denoted by reference numeral "106," although preferably only one tag (at one position) is utilized. Alternative embodiments may use a different technique to affix the tag 106 to the pallet 102, affix the tag at a different location on the pallet, or integrate the tag into the pallet itself.

The tag 106 preferably has a fixed antenna. Reference numeral 108 identifies an antenna at one of the possible tag locations. Preferably, the tag 106 is mounted on the pallet 102 so that the antenna 108 is oriented parallel to the side of the pallet 102 adjacent to the tag. The antenna 108 is also preferably in the plane defined by the belt 116. Alternative embodiments of the tag 106 place the antenna 108 in a different orientation.

Since the pallet 102 has a random orientation with respect to the sides of the conveyor 100, the tag's antenna 108 also has a random orientation. As a result, the sense of the tag's antenna 108, e.g., the orientation of at which the antenna will react to a field having a given polarization, is random. If, however, the pallet 102 is too wide to fit through the conveyor 100 diagonally or the pallet 102 is near the side of the belt 116, the rails 118 on the sides of the conveyor 100 constrain the orientation of the pallet and antenna 108. If the tag 106 is near a side of the conveyor 100, the tag's antenna 108, and its sense, are necessarily aligned substantially parallel to the sides of the conveyor (i.e., aligned parallel to the direction of travel).

A reader 110 extends across the conveyor 100 in order to read the tag 106 as the pallet 102 passes by the reader 110. In one embodiment, the reader 110 is located beneath the belt 116, although in alternative embodiments it is located above the belt or elsewhere. In an alternative embodiment, the pallet 102 remains stationary while the reader 110 moves. The reader 110 is preferably coupled to a computer system 112 via a connection 120 such as an RS-232 serial link. However, in alternative embodiments the connection 120 couples the reader 110 to the computer system 112 with a local or wide area network. The computer system 112 is preferably coupled via the network 114 to one or more general- or specific-purpose computer systems for tracking the flow of goods through the supply chain.

Figure 2:
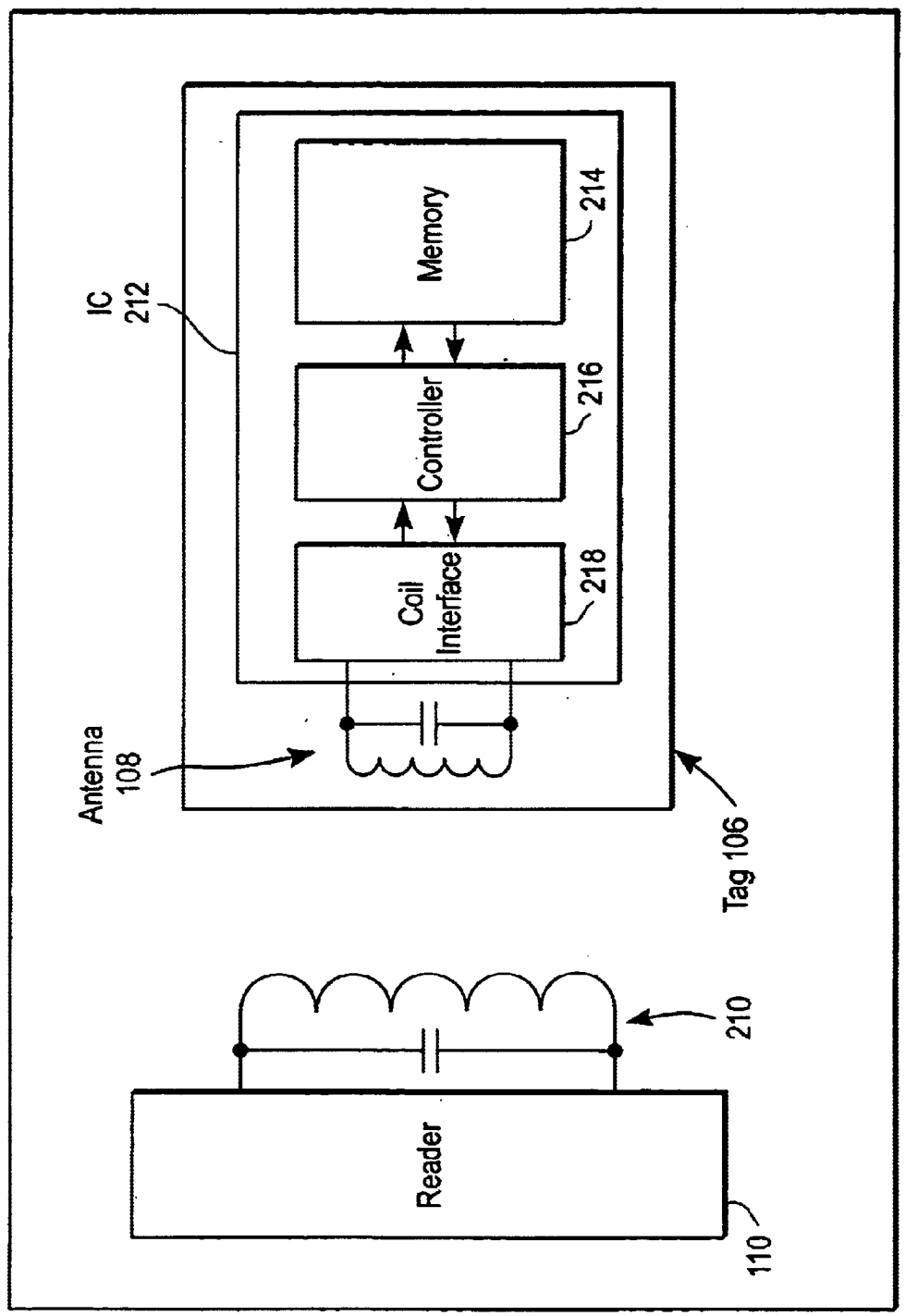
FIG. 2 is a high-level block diagram illustrating a more detailed view of the relationship between the tag and the reader of FIG. 1.

FIG. 2 is a high-level block diagram illustrating a more detailed view of the relationship between the tag 106 and the reader 110. Preferably, the reader 110 is an integrated assembly having self-contained electronics and an antenna 210. In the preferred embodiment, the antenna 210 comprises a series of antennas as shall be described in connection with FIG. 3. In one embodiment, the reader 110 accepts a 220 V AC input (not shown) and has an RS-232 serial interface (shown in FIG. 1 as element 120).

The tag 106 is passive and preferably contains a TEMIC e5550 integrated circuit 212, although alternative embodiments of the present invention utilize different integrated circuits. The integrated circuit 212 comprises a controller 216 which interfaces with a memory 214 containing data representative of the unique identifier associated with the tag. The controller 216 controls a coil interface 218 which is coupled to the antenna 108. The antenna 108 preferably has a ferrite core.

The antenna 210 of the reader 110 preferably generates a 125 kHz radio-frequency (RF) field that powers and clocks the controller 216 and other elements in the tag 106. The controller 216 counts the RF pulses and changes the load on the antenna 108 in a sequence determined by the data stored in the memory 214. This sequence indicates the unique identifier associated with the tag 108.

In one embodiment, the controller 216 amplitude modulates the load on the tag's antenna 108 at either 12.5 kHz or 15.625 kHz to respectively indicate a binary zero or one. The changes in the load across the tag's antenna 108 cause minute changes to the impedance of the reader's antenna 210. The reader 110 recovers the data by first detecting the amplitude modulation and then discriminating between the two modulation frequencies to determine the binary value of the data bit.

Figure 3:
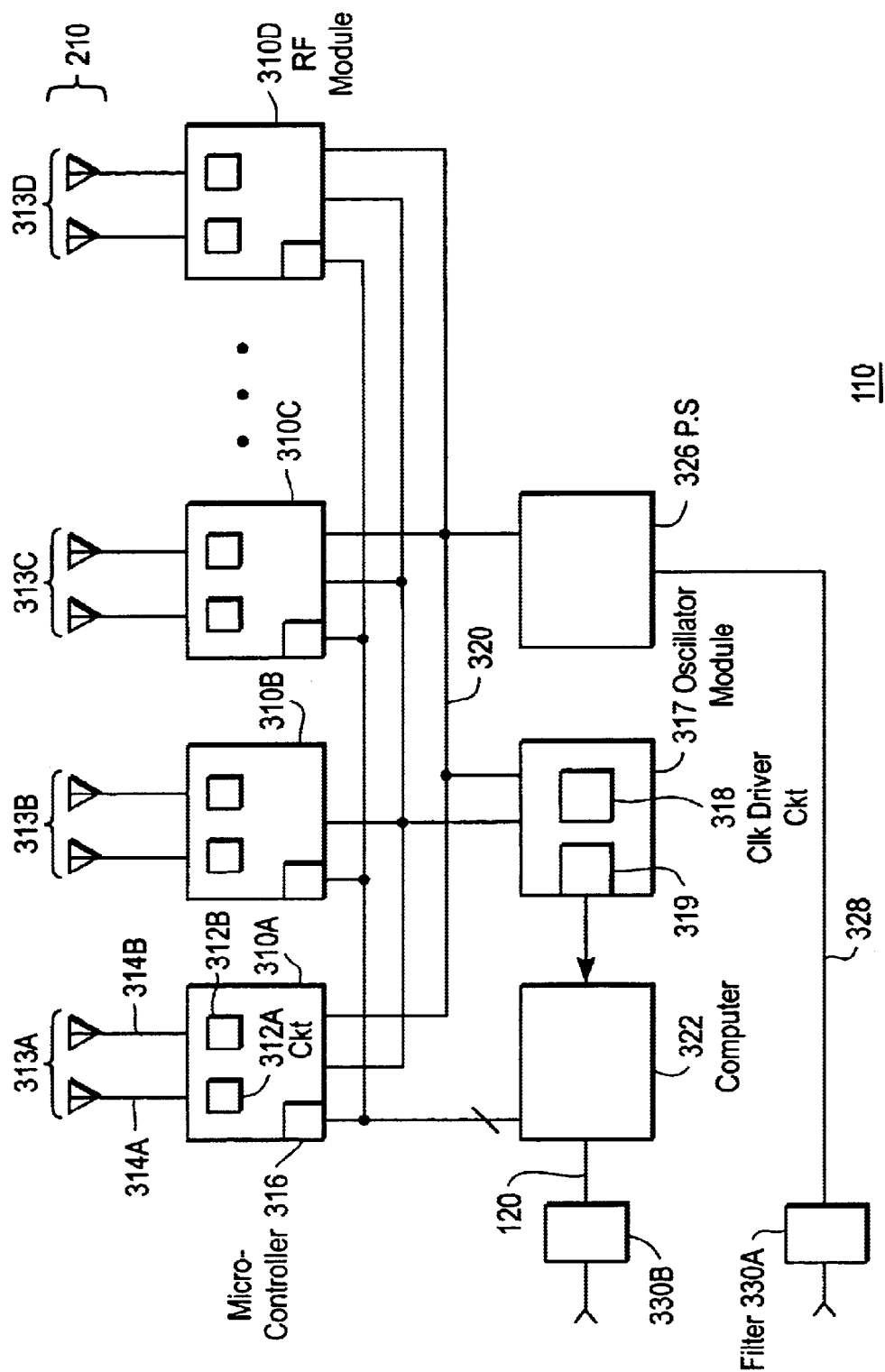
FIG. 3 is a high-level block diagram illustrating a more detailed view of the reader.

FIG. 3 is a high-level block diagram illustrating a more detailed view of the reader 110. In a preferred embodiment, the reader 110 includes 11 RF modules 310 (four of which are shown in FIG. 3, labeled 310A–D). Each RF module 310 preferably contains two rod antenna driver circuits, of which circuits 312A and 312B are exemplary, for a total of 22 rod antenna driver circuits 312. Each driver circuit 312 preferably has a low impedance output designed to drive a series resonant circuit. The inductor of this LC circuit is preferably wound on an approximately 6.5 inch-long/0.5 inch-diameter ferrite rod and serves as a rod antenna. Each driver circuit 312 also preferably has a modulation detector for detecting minute changes to the impedance of the rod antenna caused by the tag 106. As identified in FIG. 3 by reference numeral 310A, each RF module 310 drives two rod antennas, represented by rod antennas 314A and 314B, for a total of 22 rod antennas. Each pair of rod antennas driven by an RF module 310 is referred as an "antenna" and identified by reference numeral 313. There are a total of 11 antennas 313 (four of which are shown in FIG. 3 and labeled 313A–D). The aggregate of the antennas 313 is identified as antenna 210. Each RF module 310 also preferably contains a micro-controller, of which micro-controller 316 is representative, for recovering data from the antennas 313 and driver circuits 312 associated with the RF module.

A preferred embodiment of the reader 110 has 11 antennas 313 in order to cover the eight foot width of the conveyor 100. Alternative embodiments of the reader 110 have a different number of antennas, and, therefore, a correspondingly different number of RF modules 310, driver circuits 312, micro-controllers 316, etc. Those of ordinary skill in the art will recognize that the present invention can be utilized with any practical number of antennas.

The reader 110 preferably includes a reference oscillator module 317 having a central clock driver circuit 318 that provides 8 MHz, 1 MHz, and 125 kHz reference signals to the RF modules 310. Preferably, these signals are sent along daisy chained coaxial cables 320 which are impedance terminated at the last module 310. The 8 MHz signal provides a general clock signal to the RF modules 310, the 1 MHz reference signal is used by the RF modules 310 to provide accurate phase delays to the 125 kHz reference signal., and the 125 kHz signal drives the antennas 313. The reference oscillator module 317 also preferably includes a voltage regulator 319 for regulating power sent to a computer 322.

The computer 322 controls the operation of the reader 110. In one embodiment, the computer 322 is a general purpose computer system, such as an IBM PC-compatible computer system containing conventional hardware and/or software for interfacing with the RF modules 316. Alternatively, the computer 322 is a dedicated computer system. Preferably, the computer 322 provides two control bits to each RF module 310 that selectively enable and disable the transmit field generated by the rod antennas 314 of the RF module. The computer 322 also receives the data recovered by the RF modules 310, determines the tag identifiers from the data, and transmits the tag identifiers via the output 120.

FIG. 3 also illustrates a power supply 326 for powering the reader 110. In one embodiment, the power supply receives a 220 volt AC input 328 and provides a 15 volt DC output. Preferably, filters 330A, 330B on the power supply input 328 and the serial output 120 provide transient suppression.

Figure 4:
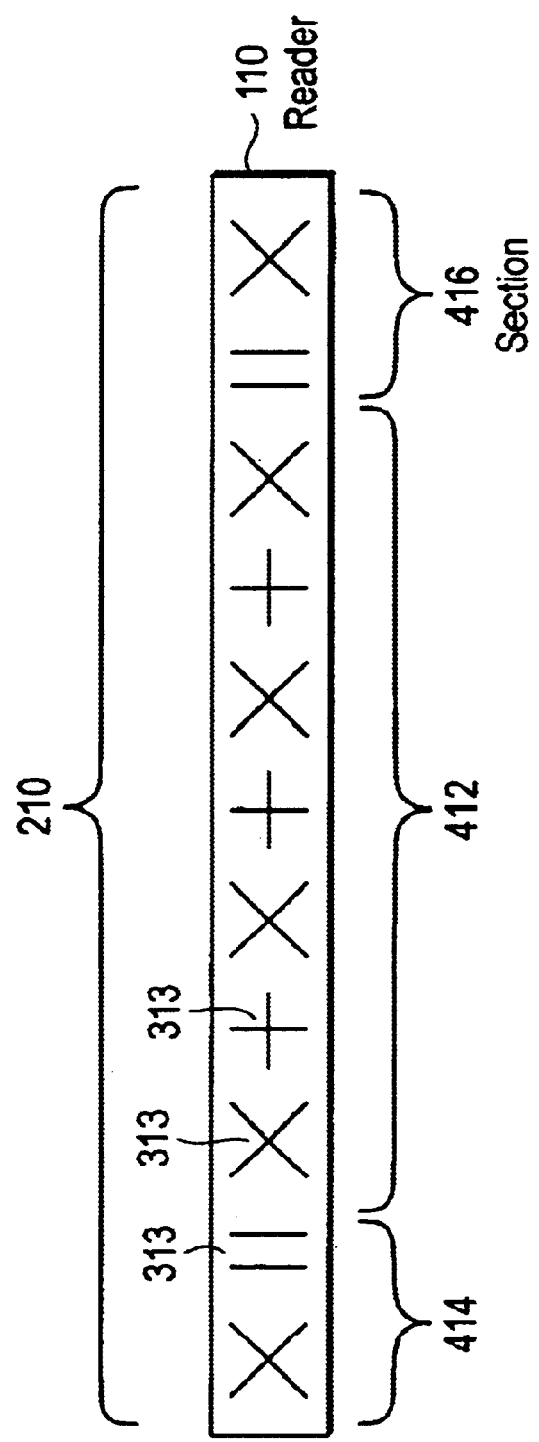
FIG. 4 is a block diagram illustrating the configuration of the antennas in the reader.

FIG. 4 is a block diagram illustrating a preferred configuration of the antennas 313 in the reader 110. A plurality of antennas 313 are arranged in linear fashion to extend across the width of the conveyor 100. The plurality of antennas 313 of FIG. 4 are grouped and identified with reference numeral 210 to indicate that they correspond to the antenna illustrated and identified with "210" in FIGS. 2–3. Likewise, the enclosure surrounding the antennas is identified with reference numeral 110 to indicate that it generally corresponds to the reader 110 identified in FIGS. 1, 2, and 3. The antennas 313 are grouped into three sections 412, 414, 416.

The pair of rod antennas 314A and 314B forming an antenna 313 and controlled by an RF module 310 are arranged in one of three configurations: "∥," "x," or "+." In the first configuration, "∥," the two rod antennas are in parallel while in the latter two configurations, "x" and "+," the rod antennas are orthogonally crossed. These latter two configurations are the same except that the rod antenna pair of one configuration is physically rotated 45 degrees about an axis normal to the common plane of the rods, relative to the other configuration. This rotation minimizes the coupling between the ends of the antenna rods. If like-oriented antennas were adjacent, the ends of the antenna rods would be close together and the large coupling between the antenna rods could cause the reader 110 to behave unpredictably. Alternative embodiments of the present invention use different orientations or techniques to control coupling between adjacent antenna rods.

Section 412 of antenna 210 preferably contains two interleaved linear arrays of antennas 313, one array of "x" oriented antennas and another array of "+" oriented antennas, arranged as follows:

x + x + x + x

In one embodiment, the distance between antennas 313 of the same array (i.e., between "x x" or "++") is approximately 12 inches. Preferably, the RF modules 310 driving the antennas within section 412 use the 125 kHz and 1 MHz reference signals to drive one rod antenna of the crossed pair with a 90 degree phase offset relative to the other rod antenna. This offset causes each antenna 313 to produce a circularly polarized field. Therefore, the sense of each antenna 313 within the middle section 412 is correspondingly circular. The antennas 313 in each array are preferably phased such that the circularly polarized fields of adjacent antennas have opposite rotation. The two arrays are preferably time multiplexed so that each array of antennas is excited every other read cycle.

In an exemplary embodiment, the antenna arrays and fields are arranged as follows:

x + x + x + x
L L R R L L R

The leftmost antenna is in the "x" array, is oriented as an "x," and is phased to produce a left-hand rotation (counterclockwise) field (i.e., a left-hand sense rotation). The adjacent antenna is in the "+" array, is oriented as a "+," and is phased to produce a left-hand rotation (counterclockwise) field. The next adjacent antenna is in the "x" array, is oriented as an "x," and is phased to produce a right-hand rotation (clockwise) field (i.e., a right-hand sense rotation). The next adjacent antenna is in the "+" array, is oriented as a "+," and is phased to produce a right-hand rotation (clockwise) field. In a similar manner, the orientation and phasing continues across the reader 110. This opposite rotation within an array keeps a constant coupling between adjacent antennas in the array and causes the vector component of the polarization in the direction of the conveyor 100 travel to have a uniform field strength across the entire length of the reader antenna 210.

The field strength of the orthogonal vector component (i.e., the field strength across the width of the conveyor 100) of an antenna array has a peak located above each antenna 313 with a null between each antenna 313. Interleaving the two arrays causes the nulls of one array to cover the peaks of the other. This coverage allows the magnetic flux path to be defined for each antenna and the pattern to be indefinitely repeated across the width of the conveyor 100 without impacting the field pattern from individual antennas.

Figure 5A:
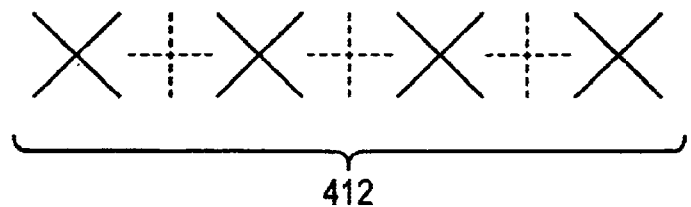
FIG. 5 illustrates the fields generated by the antennas in the middle section of the reader of FIG. 4.
Figure 5B:
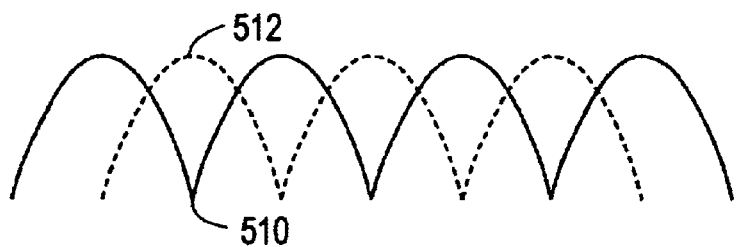
Figure 5C:
Figure 5D:
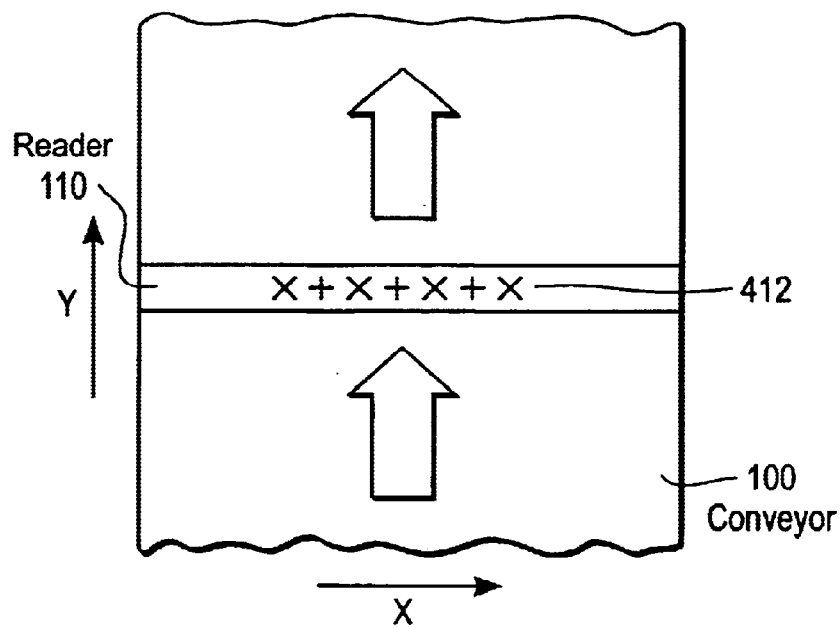

FIG. 5A illustrates the middle section 412 of the reader antenna 110 of FIG. 4, FIGS. 5B and 5C illustrate the field strength pattern it generates, and FIG. 5D illustrates the middle section in context with the conveyor 100. In FIG. 5A, the "x" oriented antennas are represented with solid lines while the "+" oriented antennas are represented with dotted lines. FIG. 5D superimposes the middle section 412 over the conveyor 100 and defines the X-dimension as extending across the width of the conveyor and the Y-dimension as parallel to the direction of conveyor movement.

FIG. 5B illustrates the field strength generated by the middle section 412 in the X-dimension and FIG. 5C illustrates the field strength generated in the Y-dimension. FIGS. 5B and 5C are aligned with FIG. 5A and, as with FIG. 5A, the fields generated by the "x" oriented antennas are illustrated with solid lines and the fields generated by the "+"-oriented antennas are illustrated with dotted lines. As shown by FIG. 5B, the nulls (such as null 510) generated by the "x" oriented antennas overlap with the peaks (such as peak 512) generated by the "+"-oriented antennas, and vice-versa. Thus, there are effectively no null areas across the width of the conveyor 100. FIG. 5B illustrates that the middle section 412 produces an essentially constant field in the Y-dimension.

When the tag 106 passes the middle section 412 of the reader 110, the tag's antenna 108 interacts most strongly with the reader antennas 313 closest to the tag. Since the antennas 313 generate circularly polarized fields, the fields will interact with the tag's antenna 108 regardless of the orientation of the tag 106, thereby allowing the reader 110 to read the identifier from the tag.

Returning to FIG. 4, the side portions 414, 416 of the reader antenna 110 preferably have two pairs of rod antennas 314 arranged in "x ∥" (left side) and "∥x" (right side) configurations. The "∥" rod antennas are parallel to the conveyor's direction of travel and generate a uniform field and have a sense aligned in the same direction. Since the tag 106 is preferably mounted in the middle of a top edge of the pallet 102 with the tag's antenna 108 oriented parallel to the edge, and the sides of the conveyor are lined with rails 118, the tag's antenna must be parallel to the direction of travel if the tag is near the edge of the conveyor 100. Therefore, the "∥" rod antennas on the left 414 and right 416 sides of the reader antenna 110 are aligned and can interact with the tag's antenna 108 should the tag 106 pass by either side of the reader 110.

If necessary or desired, the "∥" rod antennas can be extended indefinitely to cover a wider portion of the conveyor. In addition, there can be an odd number of linear antennas aligned in the conveyor's direction of travel if such an embodiment is supported by the underlying antenna driver circuitry. Accordingly, alternative embodiments of the present invention have can have one or more "∥" rod antennas on the left and/or right sides in a configuration such as "∥∥∥∥∥."

The patterns from the "∥" rod antennas on the left 414 and right 416 sides of the reader antenna 110 are preferably integrated with the two circular patterned arrays in the middle section 412 by phasing the "∥" rod antennas coherently with the vector component of the middle section with the same polarization direction. Specifically, if the "∥" rod antennas are used as the reference phase, the "x" crossed pairs physically oriented at +45 degrees and −45 degrees are driven with RF signals that are at electrical phases of +45 degrees and −45 degrees. The "+" crossed pairs physically oriented at 0 and 90 degrees are driven with RF signals that are at electrical phase of 0 and 90 degrees. The "‖" rod antennas are preferably not time multiplexed. Therefore, the "‖" rod antennas are excited on each read cycle whereas the antennas 313 in the middle section 412 are excited on every other read cycle.

As illustrated in FIG. 4, the left 414 and right 416 sides of the reader antenna 110 also include "x" crossed pairs. These crossed pairs are driven with coherent phase so that each pair behaves as a single linear element and produces polarization identical to that of the "‖" antenna configuration. The embodiment of the reader antenna 110 illustrated in FIG. 4 utilizes the crossed pairs at the ends because there is no room for an additional set of parallel (i.e., "‖") rod antennas and the crossed pairs generate more field strength than a single linear antenna. In addition, the crossed pairs are less sensitive to distortion caused by metal at the ends of the reader antenna 110 assembly. Accordingly, the "x" crossed pairs at the left 414 and right 416 sides of the reader antenna 110 are utilized due to practical constraints. Alternative embodiments of the reader antenna 110 lack the "x" crossed pairs. Indeed, alternative embodiments of the present invention lack the side portions 414, 416 altogether.

The receive pattern of the reader 110 is different than the read patterns of the individual antennas 313 because each antenna rod 314 has its own modulation detector (in the antenna driver circuit 312) and behaves independently from the other antenna rods. Therefore, although the antennas in the middle section 412 exhibit circular polarization for the radiated field strength due to the phase relationship of the applied excitation voltage, the same pairs of rods behave as cross polarized pairs with two distinct received signal outputs. The two output signals may be processed separately or combined after the modulation is recovered.

In sum, the reader antenna 110A of FIG. 4 contains a middle section 412 having two interleaved arrays of antennas 313 producing circularly polarized fields that are arranged so that the nulls in the electromagnetic field of one array are covered by the peaks in the field of the other array. Since the fields are circularly polarized, the sense of the tag's antenna 108 will align with the sense of the field generated by at least one of the circularly polarized antennas regardless of the orientation of the tag 106. The end portions 414, 416 of the reader antenna are adapted to align with the sense of the tag's antenna given the constraints on the tag's alignment produced by the configuration of the conveyor 100. Once the senses are aligned, the tag 106 communicates its identifier to the reader 110.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method of reading an identifier of a tag being conveyed by a conveyor, the tag having an antenna having any orientation in the plane of the conveyor, comprising the steps of:

generating a first circularly polarized field having a first rotation and a null;

generating a second circularly polarized field having a second rotation opposite the first rotation and a peak, the peak of the second field covering the null of the first field;

powering the tag with the first or second field responsive to the first or second field aligning with the orientation of the tag's antenna, wherein the powered tag changes a load on the tag's antenna responsive to data stored in the tag;

detecting impedance changes caused responsive to the load on the tag's antenna;

determining the tag's identifier responsive to the detected impedance changes: and wherein there are a plurality of first fields and a plurality of second fields, the first fields are generated by a first linear array of antennas, the second fields are generated by a second linear array of antennas, adjacent antennas in the first and second arrays generate fields having opposite rotation, and the first and second linear arrays are linearly interleaved such that the peaks of the second fields cover the nulls of the first fields.

2. The method of claim 1, wherein the antennas of the second array are each physically rotated on an axis to reduce coupling to adjacent antennas of the first array.

3. The method of claim 2, wherein the antennas of the second array are each rotated on their axis by 45 degrees relative to the antennas of the first array.

* * * * *